United States Patent
Jeong et al.

(10) Patent No.: US 6,238,761 B1
(45) Date of Patent: May 29, 2001

(54) UNIDIRECTIONAL FIBER SHEET FOR REINFORCING CONCRETE BEAMS AND METHODS OF PREPARING THE SAME

(75) Inventors: Seong-roon Jeong; Hoon-hee Jeong, both of Kyunggi-do; Hern-jin Park, Seoul; Do-hyun Kim, Kyunggi-do, all of (KR)

(73) Assignee: Sunkyong Industries Co., Ltd. (KR)

( * ) Notice: Subject to any disclaimer, the term of this patent is extended or adjusted under 35 U.S.C. 154(b) by 0 days.

(21) Appl. No.: 08/900,563

(22) Filed: Jul. 25, 1997

(51) Int. Cl.$^7$ .................................................. B32B 33/00
(52) U.S. Cl. ................. 428/41.8; 428/297.7; 428/298.1; 428/196; 428/198; 428/202; 442/26; 442/27; 442/204; 156/291
(58) Field of Search ............................... 442/26, 27, 204; 428/297.7, 298.1, 41.8, 202, 196, 198; 156/290, 291

(56) References Cited

U.S. PATENT DOCUMENTS 2,539,420 * 1/1951 Hazeltine et al. .................. 428/202
4,889,234 * 12/1989 Sorensen et al. .................. 428/41.8

FOREIGN PATENT DOCUMENTS 5-332031 * 12/1993 (JP) .
8-142238 * 6/1996 (JP) .
9-118760 * 5/1997 (JP) .

* cited by examiner

Primary Examiner—Elizabeth M. Cole
(74) Attorney, Agent, or Firm—Woodcock Washburn Kurtz Mackiewicz & Norris

(57) ABSTRACT

Disclosed is a unidirectional fiber sheet comprising an arranged fiber layer, a multi axial scrim, and a release paper having 3 to 80% of its surface area coated with an adhesive. The adhesive is applied to the release paper in the form of stripes which may be positioned parallel, perpendicular or oblique to the filaments of the arranged fiber layer. The unidirectional fiber sheet according to the present invention is prepared by partially coating a release paper with an adhesive, and heat-pressing together an arranged fiber layer prepared from filament tows, a multi axial scrim having a net structure to support the arranged fiber layer, and the release paper so as to bind the three together.

13 Claims, 3 Drawing Sheets

UNIDIRECTIONAL FIBER SHEET FOR REINFORCING CONCRETE BEAMS AND METHODS OF PREPARING THE SAME

FIELD OF THE INVENTION

The present invention relates to a unidirectional fiber sheet for reinforcing concrete support structures such as buildings, bridges and other civil architecture. More particularly, the present invention relates to a unidirectional fiber sheet which comprises an arranged fiber layer, a multi axial scrim and a release paper. The release paper is partially coated with an adhesive which temporarily secures the release paper to the arranged fiber layer and multi axial scrim. The adhesive coating covers about 3 to 80% of the surface area on one surface of the release paper.

BACKGROUND OF THE INVENTION

Buildings, bridges and other civil architecture, over a long period of time, can deteriorate. In other words, structural support members such as beams, pillars, walls, etc. can weaken over time. It is known in the art to use reinforced fabric material to repair weakened support structures. One method of reinforcing deteriorating civil architecture comprises the steps of coating the damaged portion of the structure with a primer, coating a room temperature curable resin over the primer, and adhering a reinforced fabric material over the room temperature curable resin layer. The weakened structure agglutinates with the reinforced fabric material by means of the room temperature curable resin so as to enhance the strength of the weakened structure.

Typically, the reinforced fabric material used in the above described processes is a unidirectional fiber sheet. Generally, such a unidirectional fiber sheet comprises an arranged fiber layer which is prepared from filament tows, a multi axial scrim having a net-like structure which supports the arranged fiber layer, and a release paper which is adhered to the arranged fiber layer and multi axial scrim.

In the above described process, after the unidirectional fiber sheet is applied over the layer of curable resin, the exterior surface of the unidirectional fiber sheet, i.e. the release paper surface, is rolled or patted to insure maximum contact between the unidirectional fiber sheet and the curable resin. Thereafter, the release paper is peeled away from the multi axial scrim. The capacity of this process to strengthen the deteriorating structure is limited by the amount of curable resin which permeates and impregnates the fiber sheet and scrim.

The inventors have observed that the degree to which the curable resin permeates and impregnates the fiber layer is effected by the adhesive coating by which the release paper is secured to the fiber layer and multi axial screen. In particular, the greater the release paper surface area which is covered with adhesive, the less curable resin will permeate and impregnate the arranged fiber layer. Generally, the viscosity of the adhesive is more than several millions centipoise (cps) and the viscosity of the curable resin is almost several ten thousands cps. As a result, the resin can hardly permeate the adhesive layer.

In prior art unidirectional fiber sheets, the entire surface of the release paper which abuts the surface of the fiber layer and multi axial scrim is coated with adhesive. The inventors have observed that when such prior art unidirectional fiber sheets employed, the curable resin does not adequately permeate the fiber layer and scrim. As a result, the agglutinating force between the structure and the unidirectional sheet is deficient and the reinforcing effect of the process less than optimal.

OBJECTS OF THE INVENTION

It is therefore desirable and an object of the present invention to provide a unidirectional fiber sheet which provides improved reinforcing effect by maximizing the permeation and impregnation of curable resin into the fiber sheet.

It is another object of the present invention to provide a unidirectional fiber sheet having a release paper that is sufficiently adhered to an arranged fiber layer and multi axial scrim during the application process, and that can be easily removed from the arranged fiber layer and multi axial scrim after application.

It is still a further object of the present invention to provide a method of preparing a unidirectional fiber sheet with the above properties.

SUMMARY OF THE INVENTION

Accordingly, the present invention provides a unidirectional fiber sheet which provides improved reinforcing effect by maximizing the permeation and impregnation of curable resin into the fiber sheet, and which also sufficiently adheres to the fiber layer while being easily removed from the fiber layer after application.

In one presently preferred embodiment of the present invention, the unidirectional fiber sheet comprises an arranged fiber layer, a multi axial scrim for supporting the arranged fiber layer, and a release paper partially coated with an adhesive so as to adhere to the arranged fiber layer and the multi axial scrim, wherein 3 to 80% of the surface area of the release paper is coated with the adhesive.

The adhesive is applied to the release paper in the form of stripes wherein the stripes may be positioned parallel or perpendicular to the filaments of the arranged fiber layer. The adhesive is a material selected from the group consisting of epoxy resin, unsaturated polyester resin, and polyurethane resin.

The arranged fiber layer is made of a fiber selected from the group consisting of carbon fiber, boron fiber, aramid fiber, glass fiber, polyethylene fiber, polyarylate fiber and steel fiber.

The multi axial scrim is preferably a tri-axial scrim. The multi axial scrim is made of a yarn which is selected from the group consisting of nylon, polyester, aromatic polyamide, carbon fiber and glass fiber.

Another aspect of the invention is the method of preparing the inventive unidirectional fiber sheet. In the preferred embodiment the method comprises the steps of: providing a release paper partially coated with an adhesive, wherein 3 to 80% of the surface area of the release paper is coated with the adhesive; and heat-pressing together an arranged fiber layer prepared from filament tows, a multi axial scrim having a net structure to support the arranged fiber layer, and the release paper.

BRIEF DESCRIPTION OF THE DRAWINGS

The present invention will be more fully understood, and its numerous objects and advantages will become apparent by reference to the following detailed description of the invention when read in conjunction with the accompanying drawings, in which.

DETAILED DESCRIPTION OF THE PREFERRED EMBODIMENTS

Figure 1:
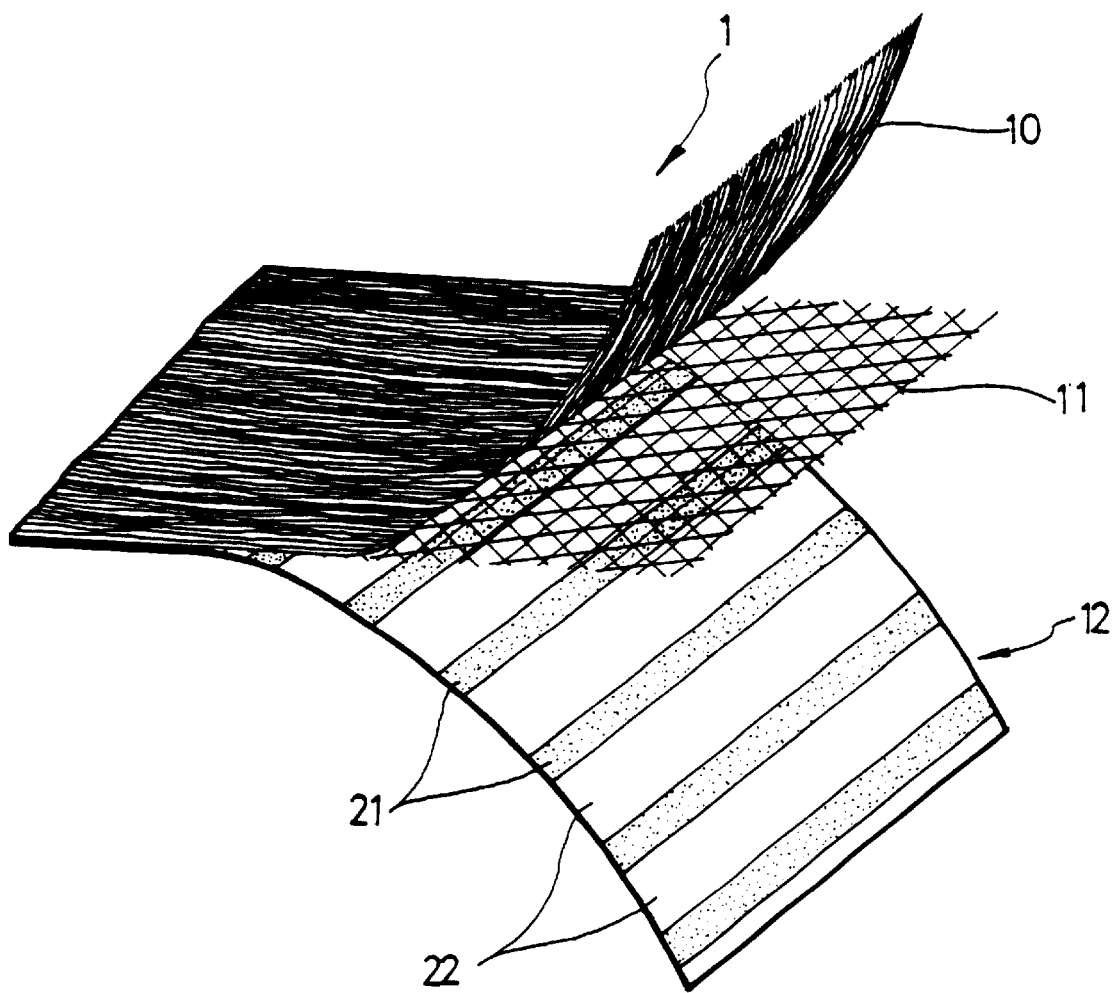
FIG. 1 is a schematic perspective view of a delaminated unidirectional fiber sheet according to the present invention.

FIG. 1 is a schematic perspective view of a partially delaminated unidirectional fiber sheet according to the present invention. A unidirectional fiber sheet according to the present invention comprises an arranged fiber layer 10 prepared from filament tows and having a weight of about 150 to 300 g/m$^2$, a multi axial scrim 11 having a net structure to support the arranged fiber layer, and a release paper 12 to which the arranged fiber layer and multi axial scrim adhere.

The arranged fiber layer 10 is a non-woven fabric which is prepared by arranging filaments from a plurality of filament tows. It is preferable that the arranged fiber layer 10 has a weight of at least 150 g/m$^2$ and more preferably about 200 to 300 g/m$^2$. The arranged fiber layer 10 is made of fibers selected from a group comprising carbon, boron, aramid, glass, polyethylene, polyarylate and steel fibers.

The multi axial scrim 11 has a net-like structure and is positioned between the fiber layer 10 and the release paper 12. The multi axial scrim 11 operates to support the arranged fiber layer 10 and remains attached to the fiber layer 10 even after the release paper 12 has been removed. The multi axial scrim 11 may have numerous formations including a biaxial scrim, a tri-axial scrim, a quadri axial scrim, etc. In the presently preferred embodiment, a tri-axial scrim is employed.

Figure 2:
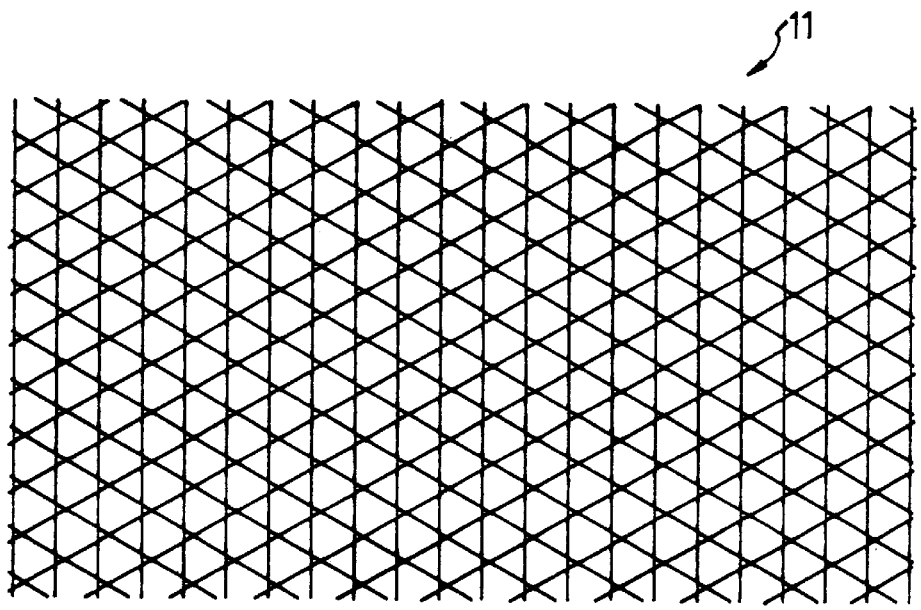
FIG. 2 is a schematic plan view of a tri-axial scrim having a net structure to support an arranged fiber layer.

FIG. 2 is a schematic plan view of the tri-axial scrim 11 having a net-like structure. The multi axial scrim is composed of weaved yarn where the yarn may be made of nylon, polyester, aromatic polyamide, carbon fiber, or glass fiber. In the presently preferred embodiment, glass fiber is used. The yarn preferably has a diameter of about 1 to 500 μm, and more preferably about 5 to 100 μm. The thickness of the multi axial scrim 11 corresponds to the diameter of the yarn.

Referring to FIG. 1, the release paper 12 has stripes of adhesive material 21 as well as areas 22 where there is no adhesive. This is in contrast to a conventional unidirectional fiber sheet, in which the release paper is entirely coated with an adhesive on the surface which abuts the arranged fiber layer and multi axial scrim. As noted above, the adhesive coating prevents the curable resin from completely permeating the fiber layer and multi axial scrim and thus lessens the strengthening bond between the structure and the fiber sheet.

Accordingly, the release paper 12 of the present invention is not entirely coated with an adhesive, but partially coated to form stripes of coated portions 21. The stripes of the coated portions 21 may be parallel, perpendicular or oblique to the filaments of the arranged fiber layer 10. In the areas that are not coated 12, the curable resin permeates through the arranged fiber layer 10 and the multi axial scrim 11 so as to form a stronger bond between the support structure and the unidirectional fiber sheet. Examples of the adhesive material which can be used in this invention are epoxy resin, unsaturated polyester resin and polyurethane resin.

The total area of the coated portions 21 is preferably about 3 to 80% of the total surface of one side of the release paper 12. If the total surface area of the coated portions 21 is less than about 3%, the release paper is too easily peeled off during application of the fiber sheet to the support structure. However, if the total area of the coated portions 21 is more than about 80%, the room temperature curable resin does not adequately permeate the arranged fiber layer 10 and the multi axial scrim 11. Therefore, in the presently preferred embodiment, the total area of the coated portions 21 is about 10 to 50% of the total surface area of one side of the release paper 12.

Figure 3:
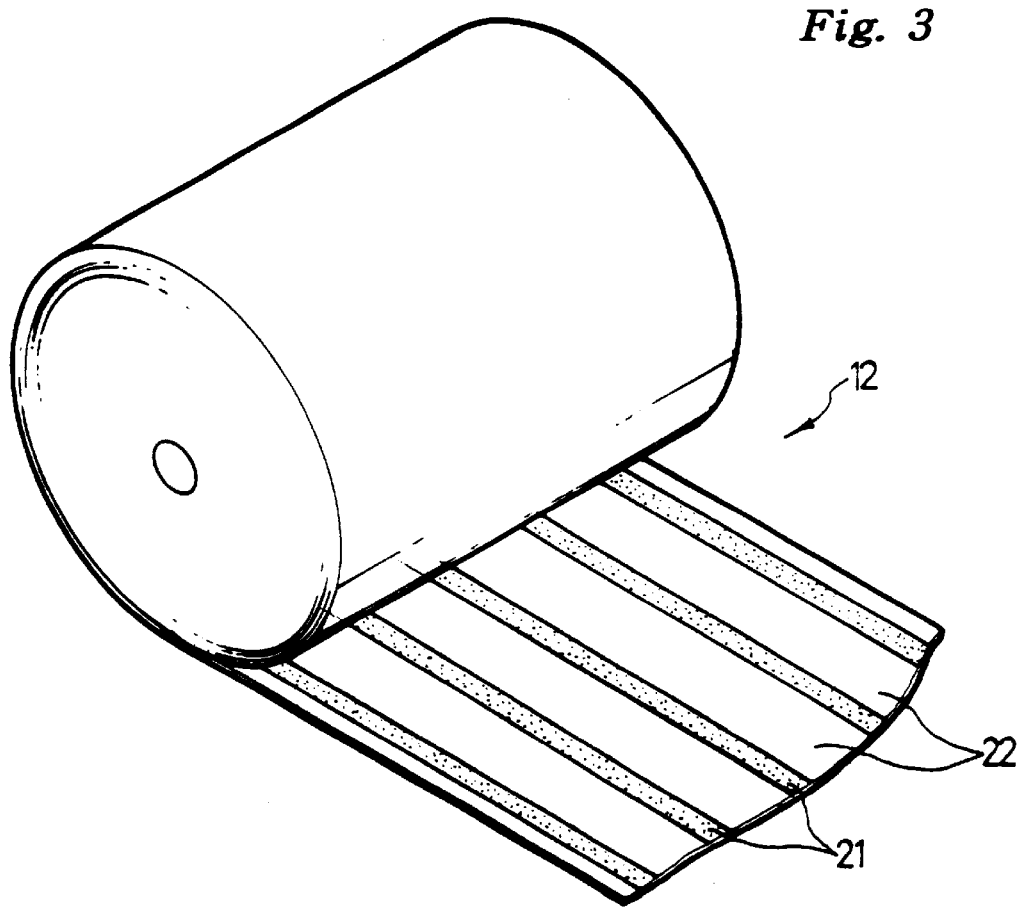
FIG. 3 is a schematic perspective view showing an embodiment of a release paper on which stripes of adhesive are formed parallel to the filaments of the arranged fiber layer.

FIG. 3 provides a perspective view of the inventive fiber sheet. As shown, the stripes of adhesive 21 are formed parallel to the filaments of the arranged fiber layer. This is in contrast to the stripes shown in FIG. 1, which are arranged perpendicular to the filaments of the arranged fiber layer 10. Applicants have observed that a unidirectional fiber sheet having stripes perpendicular to the filaments of an arranged fiber layer provides a stronger reinforcing force than a unidirectional fiber sheet of the release paper 12 having stripes parallel to the filaments of an arranged fiber layer.

The present inventive unidirectional fiber sheet can be applied to a concrete structure by preparing the weakened portion with a primer, coating the primer with a room temperature curable resin, applying the unidirectional fiber sheet over the room temperature curable resin, rubbing the fiber sheet sufficiently to insure sufficient contact with the curable resin, and peeling the release paper from the fiber sheet. The reduced adhesive coverage area allows the resin to more completely permeate the fiber sheet and thereby create a stronger bond. Multiple unidirectional fiber sheets according to the present invention can be applied where a stronger reinforcing effect is needed. The room temperature curable resin used in this process should be one that is room temperature curable such as an epoxy resin.

Figure 4:
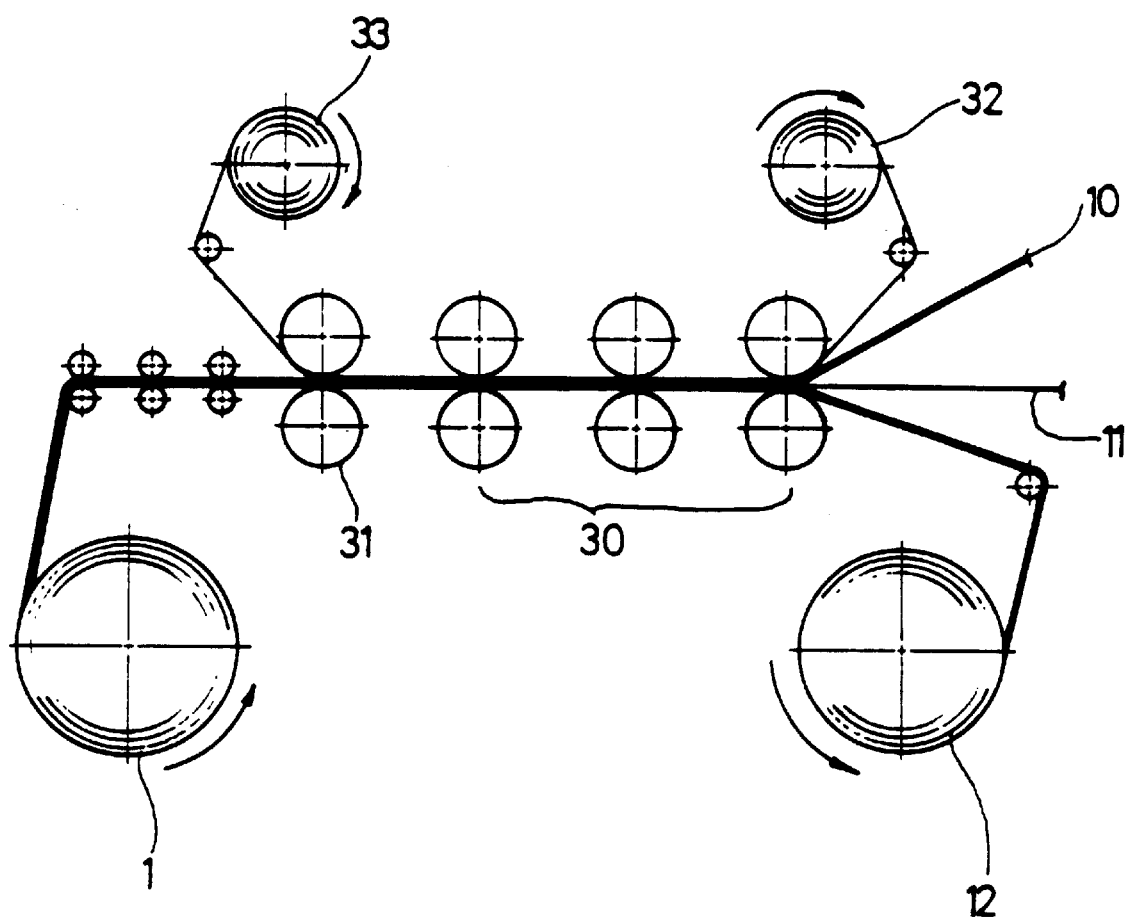
FIG. 4 is a drawing depicting a process for preparing a unidirectional fiber sheet according to the present invention.

FIG. 4 depicts a process for preparing a unidirectional fiber sheet according to the present invention. A unidirectional fiber sheet according to the present invention is prepared by providing a release paper, partially coated in the range of 3 to 80% of its surface area with an adhesive, and heat-pressing by conventional methods the release paper with an arranged fiber layer, and a multi axial scrim. As shown, release paper without adhesive is fed from a release paper roll 33, and the release paper is wound on a winding roll 33. In fact, a release paper 12, a multi axial scrim 11, an arranged fiber layer 10, and an uncoated release paper from the roll 32 are continuously fed at the same time. The four elements are heat-pressed, which is easily carried out by an ordinary skilled person in the art. A unidirectional fiber sheet according to the present invention can be obtained comprising a release paper 12, a multi axial scrim 11, and an arranged fiber layer 10.

The invention may be better understood with reference to the following examples which are intended for the purpose of illustration and are not to be construed in any way as limiting the scope of the present invention. Applicants made several unidirectional fiber sheets using varying amounts of adhesive on the release paper and thereafter applied the sheets to a structure as described above. The results of these tests demonstrate that the degree to which the epoxy resin permeates the fiber sheet is inversely proportional to the area of the release paper which is covered with adhesive.

In the first example, a release paper was prepared having stripes of adhesive material positioned parallel to the filaments of the arranged fiber layer. The stripes of adhesive had a width of 1 cm and the uncoated portions had a width of 4 cm. The coated portions covered 20% of the release paper surface area. The total quantity of coated resin was 20 g/m$^2$. The arranged fiber layer was prepared with filament tows produced by Toray Co., Ltd. of Japan (product number T-700). The tri-axial scrim was manufactured by Nittobo Co. Ltd. of Japan (product number KT331B).

In a second example, a unidirectional fiber sheet was prepared in generally the same manner as the first example with the exception that the stripes of coated portions had a width of 3 cm and the uncoated portions were 7 cm wide. The adhesive material covered 30% of surface area of the release paper.

In a third example, a unidirectional fiber sheet was prepared in the same manner as the first example with the exception that the stripes of coated portions had a width of 1 cm and the uncoated portions had a width of 1 cm. The adhesive material covered 50% of surface area of the release paper.

In a fourth example, a unidirectional fiber sheet was prepared in the same manner as the first example with the exception that the stripes of coated portions had a width of 7 cm and the uncoated portions had a width of 3 cm. The adhesive material covered 70% of surface area of the release paper.

In a fifth example, a unidirectional fiber sheet was prepared in the same manner as the first example with the exception that the stripes of coated portions were formed perpendicular to the filaments of an arranged fiber layer, as shown in FIG. 1. The adhesive material covered 20% of surface area of the release paper.

In a sixth example, a unidirectional fiber sheet was prepared in the same manner as the fifth example with the exception that the stripes of coated portions had a width of 0.3 cm and the stripes of uncoated portions had a width of 0.7 cm. The adhesive material covered 30% of surface area of the release paper.

Two comparative samples were prepared for the purposes of the experiment. In the first comparative sample, a unidirectional fiber sheet was prepared in the same manner as the first example except that an adhesive was coated on the entire surface of the release paper. Thus, the total coated surface area of the release paper was 100%.

The second comparative sample fiber sheet was prepared in the same manner as the first example with the exception that the coated stripes had a width of 9 cm and the uncoated striped portions had a width of 1 cm. The total coated surface area of the release paper was 90%.

For each of the above described unidirectional fiber sheets, primer was coated on a concrete beam and a layer of epoxy resin produced by Konishi Co., Ltd. of Japan (product number E250OW) was applied. The unidirectional fiber sheet was applied to the surface area where the curable resin had been coated. The unidirectional fiber sheet was sufficiently pressed with a roller and the release paper peeled away. After 2 hours, the area through which the epoxy resin had permeated was measured. The results are shown in Table 1. As shown, the total area that the epoxy resin permeated is inversely proportional to the total surface of the release paper that was covered with adhesive.

TABLE I

|  | Examples | | | | | | Comp. Examples | |
| --- | --- | --- | --- | --- | --- | --- | --- | --- |
|  | 1 | 2 | 3 | 4 | 5 | 6 | 1 | 2 |
| resin permeated area *(%) | 73 | 65 | 46 | 23 | 70 | 63 | 0 | 5 |

*resin permeated area (%): total area that the epoxy resin permeated out, per the total surface of the unidirectional fiber sheet or the release paper.

The present invention may be employed in other specific forms without departing from the spirit or essential attributes thereof. For example, the adhesive material may be placed on the adhesive paper in formations other than stripes such as circular and asymmetric arrangements. Therefore, while the invention has been described and illustrated with reference to specific embodiments, those skilled in the art will recognize that modification and variations may be made without departing from the principles of the invention as described hereinabove and set forth in the following claims.

What is claimed is:

1. A method of preparing a fiber sheet having a fiber layer, a multi axial scrim, and a release paper for reinforcing a body comprising the steps of:

providing a release paper partially coated with an adhesive; and heat-pressing together an arranged fiber layer prepared from filament tows, a multi axial scrim having a net structure to support the arranged fiber layer, and said release paper so that a first area of the fiber layer and multi axial scrim have the adhesive applied thereto and a second area of the fiber layer and multi axial scrim have no adhesive applied thereto, said second area being more permeable to resin than said first area, wherein the adhesive is applied to the fiber layer substantially perpendicular to the filament tows.

2. The method according to claim 1 wherein said adhesive is applied to said release paper in the form of stripes wherein the stripes are positioned perpendicular to the filaments of said arranged fiber layer.

3. A fiber sheet for reinforcing a body, comprising:

a fiber layer;

a multi axial scrim for supporting said fiber layer; and a release paper partially coated with an adhesive and adhered to said fiber layer and multi axial scrim with the adhesive so that a first area of the fiber layer and multi axial scrim have the adhesive applied thereto and a second area of the fiber layer and multi axial scrim have no adhesive applied thereto, said second area being more permeable to resin than said first area, wherein the adhesive is applied to the fiber layer substantially perpendicular to the filament tows.

4. A unidirectional fiber sheet according to claim 3 wherein said adhesive is applied to said release paper in the form of stripes wherein the stripes are positioned perpendicular to the filaments of the arranged fiber layer.

5. A unidirectional fiber sheet according to claim 3 wherein said adhesive is a material selected from the group consisting of epoxy resin, unsaturated polyester resin, and polyurethane resin.

6. A unidirectional fiber sheet according to claim 3 wherein said arranged fiber layer is made of a fiber selected from the group consisting of carbon fiber, boron fiber, aramid fiber, glass fiber, polyethylene fiber, polyarylate fiber and steel fiber.

7. A unidirectional fiber sheet according to claim 3 wherein said multi axial scrim is a tri-axial scrim.

8. A unidirectional fiber sheet according to claim 3 wherein said multi axial scrim is made of a yarn which is selected from the group consisting of nylon, polyester, aromatic polyamide, carbon fiber and glass fiber.

9. A unidirectional fiber sheet according to claim 3 wherein between 10 to 50% of the surface area of said release paper is covered with said adhesive.

10. A fiber sheet for reinforcing a body, comprising:

a fiber layer prepared from filament tows and having weight of about 150 to 300 g/m$^2$;

a multi axial scrim having a net structure for supporting said fiber layer; and a release paper partially coated with an adhesive and adhered to said fiber layer and multi axial scrim with the adhesive so that a first area of the fiber layer and multi axial scrim have the adhesive applied thereto and a second area of the fiber layer and multi axial scrim have no adhesive applied thereto, said second area being more permeable to resin than said first area, wherein the adhesive is applied to the fiber layer substantially perpendicular to the filament tows.

11. The method of claim 1, wherein 3 to 80% of the surface area of said release paper is coated with said adhesive.

12. The fiber sheet of claim 3, wherein 3 to 80% of the surface area of said release paper is coated with the adhesive.

13. The fiber sheet of claim 10, wherein 3 to 80% of the surface area of said release paper is coated with the adhesive.

* * * * *